United States Patent Office 3,351,676
Patented Nov. 7, 1967

3,351,676
METHOD FOR PREPARING A POLYURETHANE CONTAINING 0.2 TO 5% POLYOLEFIN
James H. Saunders and Samuel Steingiser, Bridgeville, Pa., assignors to Mobay Chemical Company, Pittsburgh, Pa., a corporation of Delaware
No Drawing. Filed May 4, 1964, Ser. No. 364,802
10 Claims. (Cl. 260—859)

The present invention relates to thermoplastic polyurethane elastomeric materials, and more particularly to a method for processing polyurethanes.

In preparing polyurethane thermoplastic compositions by the reaction between a compound containing at least two active hydrogen containing groups as determined by the Zerewitinoff method and an organic polyisocyanate with a chain extender, if desired; after the reactants have been sufficiently mixed and allowed to react, the reaction mixture is generally poured onto a slab or table to cool. Such a process is described, for example, in U.S. Patent 2,729,618 and particularly in Example 12 thereof.

Much more conveniently, the reacted components are poured onto a moving conveyor belt and allowed to cool, thus facilitating a continuous or semicontinuous process adaptable for use in industrial operations for the manufacture of such materials. Conveyor belts in common use are made primarily from materials such as sheet steel and perforated sheet steel and the like, and in an attempt to facilitate release of the cooled elastomeric slab, materials treated with tetrafluoroethylene resins have been used.

In spite of the best efforts of the industry, however, one of the biggest problems involved in the preparation of polymeric polyurethane elastomeric compositions is the propensity of the elastomer for sticking to the slab, table, conveyor belt, or any other surface on which the hot polyurethane melt is poured. Because of this characteristic of elastomers in general, and polyurethane elastomers in particular, various problems are presented in their preparation. For example, because the elastomeric products stick to the belt, there is poor release which even occasions the tearing of the belt itself in some instances when attempts are made to remove the elastomer therefrom. In addition, the elastomer has a tendency in coming away from the belt to deposit material at the joinder of the belt, where it builds up and eventually causes the belt to tear.

Further, since the adhesive force holding the elastomer to the belt is greater than the cohesive force of the slab, pieces of the elastomer remain behind on the belt which harden into highly cross-linked, yellow chunks which cause "fish eyes" in subsequent slabs of elastomer, yielding non-homogeneous products.

In addition to the problem encountered with the sticking of the polyurethane elastomer to the belt, slab or table on which it is poured, an additional problem with moisture absorption by the elastomer while it is cooling confronts the operator. When any moisture is available to the cooling elastomer, even that contributed by the humidity of the air, the NCO groups in a polyurethane react with that moisture to form a cross-linked more highly reacted surface on the product which is responsible for non-homogeniety in the finished material.

Beyond these difficulties, the further processing of the elastomeric product is hampered by the difficulty encountered due to the tendency of the elastomer to stick to any surface with which it comes into contact in its melt form. Therefore, in a molding operation or in any circumstances where melt flow as well as mold release is important, the addition of a lubricant is essential. Commonly used lubricants such as the stearates are not desirable for use in polyurethane elastomeric compositions since it has been ascertained that they promote a breakdown of the polyurethane polymer. Commonly used waxes and oils are not feasible since they are substantially incompatible with the polyurethane polymer.

It is, therefore, an object of this invention to provide a method for the preparation of thermoplastic polyurethane elastomeric compositions devoid of the foregoing disadvantages.

It is a further object of this invention to provide a method whereby a polyurethane melt may be poured onto a surface such as a table or conveyor belt of any kind without the problem of having it adhere thereto.

It is a further object of this invention to provide a means whereby the moisture absorption of the elastomeric composition is substantially reduced to zero.

Yet another object of this invention is to provide an elastomeric composition which, as a consequence of being handled according to the process of this invention, is substantially prevented from adhering to surfaces with which it comes into contact thereafter.

Still further, an object of this invention is to provide a method for processing a polyurethane elastomeric composition whereby the polyurethane is internally lubricated to possess good flow properties and mold release characteristics.

These and other objects which will become apparent from the following description are accomplished in accordance with this invention, generally speaking, by providing a method for the processing of thermoplastic polyurethane elastomers wherein a polyurethane melt or reaction mixture is protected from moisture absorption and provided with a lubricant for subsequent shaping operations by disposing a mixture of components which will react to form a polyurethane between two sheets of a polyolefin, allowing chemical reaction to form a product which can be shaped by thermoplastic shaping methods and thereafter comminuting the resulting laminate and thereby dispersing the polyolefin therein.

In such a process, the polyurethane melt or reaction product may be poured onto a surface such as a table, slab or conveyor belt which has been lined with a sheet of a polyolefin having a melting point higher than the temperature of the polyurethane melt, and having a sufficiently high molecular weight, thickness and strength such that the polyurethane will stick to the polyolefin but is prevented by the polyolefin from sticking to the surface on which the polyurethane is being poured. While the polyurethane melt is being poured onto the surface which is lined with the high molecular weight polyolefin, a sheet of low molecular weight polyolefin is used to cover the top surface of the poured polyurethane. When the polyurethane has solidified and cooled, the slab is cut or scored to facilitate removal, and the polyurethane having the high and the low molecular weight polyolefin sheeting adhering thereto is then chopped and ground or otherwise reduced in size by any suitable means in order to simultaneously effect a reduction of the polyurethane to a further processable form and blend the high and low molecular weight polyolefins substantially uniformly therein.

Any suitable polyolefin may be used in the practice of this invention, such as polyethylene or polypropylene, and mixtures thereof. The amount and thickness of the high and low molecular weight polyolefin sheetings to be used should be such that from 0.2 to 5% by weight, calculated on the total weight of the polyurethane, is present, and a ratio of from about 0.5 to 2 parts of the high molecular weight polyolefin per part of low molecular weight polyolefin should be used, which polyolefin mixture has a melt index of at least 115 as defined below, but which melt index is preferably at least 1,000.

The melt index as referred to in conjunction with this invention is a measurement to determine the melt behavior of a polymer, thus indicating the degree of ease with which the polymer flows. Such measurements are made in a capillary rheometer as described in Journal of Polymer Science, Part A, vol. 1, pages 3395–3406, 1963. The specific melt-index determinations referred to hereinafter were run at one of the two following conditions, depending upon the molecular structure and molecular weight of the polyurethane:

(1) 360° F.; 100 pound load; orifice L/D of 4.
(2) 400° F.; 500 pound load; orifice L/D of 15.

This procedure was adapted from ASTM D–1238—62T. The values for the melt index thus arrived at are expressed in grams/10 minutes.

It is to be understood that the designation of the melt index at 115 is under condition (1) above-defined, and that any determination of melt index under condition (2) will always give a higher value for the melt index of the identical polymer. Therefore, in the remainder of the specification and in the claims, the designation of melt index shall refer to the melt index as measured under condition (1) hereinbefore defined unless otherwise specified.

It is preferable, in the practice of this invention, to employ as the high molecular weight polyolefin sheeting, a polyolefin having a molecular weight of from about 100,000 to about 500,000. It has been found that this high molecular weight component when blended into the polyurethane as part of a lubricating agent mixture especially facilitates the processing of polyurethanes maintained at high temperatures. For example, the high molecular weight polymer which acts as an internal lubricant for the transport of the polyurethane melt functions as an aid in the packing and fusing process required in certain shaping and curing processes in order to obtain a good product.

As the low molecular weight polyolefin sheeting, it is preferable to employ a polyolefin having a molecular weight of from about 10,000 to about 50,000. This low molecular weight component, when blended into the polyurethane as part of a lubricating agent mixture, is especially advantageous in facilitating the flow of the molten polymer into a cold mold as, for example, in injection molding.

Further, in order to obtain optimum flow properties it is advisable in the practice of this invention to use as thin sheets of the polyolefin or a mixture thereof as possible to facilitate the release and prevent the reaction with moisture of the polyurethane slab. Thereafter, in the cutting or grinding or any other suitable process for reducing the slab of polyurethane to further processable form, a polyolefin having a molecular weight of from about 1000 to about 4000 may be added. In this instance, the most ideal flow and mold release properties are obtained. Caution should be exercised, however, in order to maintain the overall concentration of polyolefins and the ratio of such low molecular weight polyolefins, including the 1000 to 4000 and 10,000 to 50,000 molecular weights, to the high molecular weight polyolefin as herein stipulated.

In a preferred embodiment of this invention, the polyolefin used as described herein is a polyethylene, or a ratio thereof in which 0.5 to 2 parts of a high molecular weight polyethylene per part of a low molecular weight polyethylene within the respective molecular weight ranges stipulated hereinbefore are used.

The polyurethane product which has been introduced between the prescribed polyolefin sheetings and cut and chopped or otherwise reduced in size as a unit therewith, is therefore internally lubricated and may be further processed by any suitable thermoplastic shaping method such as by extrusion, injection molding, calendering or the like, in order to obtain the desired end product without encountering difficulty due to the sticking of the elastomer to the surfaces with which it comes into contact. Further, the elastomeric product possesses excellent flow properties and presents a homogeneous material for further processing. In addition, the problem of moisture absorption during the reaction and cooling of the polyurethane is obviated since the laminated slab intermediate prevents the moisture of the air from getting to the polyurethane, and the surface thereof remains thermoplastic and homogeneous with respect to the other portions of the slab.

It has been found that the use of a mixture of a high and low molecular weight polyolefin in the ratios stipulated herein as polyolefin sheetings and thereafter as an internal lubricant may be advantageous for all types of polyurethane elastomers. However, it is required that one use the prescribed quantity of the polyolefin polymers as the sheetings for the conveyor belt or surface on which the polyolefin is poured, since an excess will not further expedite the processing of the polyurethane elastomer but will cause blooming, or in other words, the polyolefin polymers will appear as a film or skin on the outside of the molded or calendered or otherwise processed product. Further, if too much of the mixture of polyolefins is added to the polyurethane, the polyolefins will plate out, for instance, on the calendar rolls in a calendering operation, and ruin the surface of the product. In addition, a marked stiffening of the polyurethane may occur. Within the ranges of about 0.2 to about 5% by weight of the polyolefin calculated on the total weight of the polyurethane elastomer, many advantages are readily apparent; however, for the very best results, it is preferred that from about 0.5 to 2.0% by weight of the polyolefin be used.

It is to be understood that although the preferred process of this invention involves the use of a high molecular weight polyolefin sheeting as the base sheet and a low molecular weight polyolefin sheeting as the top sheet, one may, according to the result desired, employ a high molecular weight polyolefin for both the top and bottom sheets, or if desired, only a base sheet need be used, especially under moisture free conditions, in which case a ratio of high and low molecular weight polyolefins in admixture may be used therefor, or a sheet of the high molecular weight polyolefin may alone be employed. It is apparent that the use of a low molecular weight sheet of polyolefin will not accomplish the result desired if used as the bottom sheet in addition to being used as the top sheet since it will melt into the polyurethane melt and not prevent it from adhering to the surface on which it is poured with as much effectiveness as would a sheet of high molecular weight polyolefin in the same position. Where, however, this may not be a critical consideration and the resultant product would best be further processed without an addition of a high molecular weight polyolefin, one may employ low molecular weight polyolefin sheeting as both the top and bottom sheets and the thermoplastic polyurethane may be poured onto or processed with the polyolefin sheetings herein described by any suitable method for the preparation or processing of elastomers or melts thereof. Further, according to U.S. application Serial Number 364,817, where the use of only one uniform molecular weight polyolefin is considered expedient, one may use a polyolefin sheet having a melt index of at least 115 and a molecular weight of from about 10,000 to about 500,000. In such an instance, as well as in the case wherein the ratios stipulated herein are used, one may use sheetings comprised of the same polyolefin as both the top and base sheets or one may use one polyolefin such as a polypropylene as the base sheet and another polyolefin such as a polyethylene as a top sheet or any other combination of polyethylene, polypropylene, and mixtures thereof which may be considered expedient.

The polyurethane may be poured onto or processed with the polyolefin sheetings herein described by any suitable method for the preparation or processing of elastomers or melts thereof. In a preferred embodiment of this invention, a casting surface such as a table or conveyor belt is lined with a sheet of high molecular weight polyethylene which feeds off a roll of such material at the head of the conveyor belt or table according to the convenience of the operator and the equipment at hand.

The polyurethane melt is poured onto the high molecular polyethylene sheeting, and a sheet of the low molecular weight polyethylene sheeting is fed onto the top surface of the polyurethane melt from a feed roll situated next to the pouring aperture as the polyurethane is poured. The polyurethane is then allowed to solidify and the polyurethane-polyethylene slab is cut and scored and chopped together into suitable particle sizes for further processing, thus producing an internally lubricated elastomeric product which does not stick to the surface on which it is poured and which is homogeneous.

In another preferred embodiment, the polyethylene sheets may be used to line the internal wall of a tubular member into which the polyurethane melt is poured. The polyurethane solidifies within the tubular member to form, on discharge from the tubular member, an elongated object having a cross-sectional configuration defined by the shape of the tubular member. The polyurethane melt may be continuously poured into such tubular member with a feed roll continuously supplying the polyethylene sheets to the internal surface of the walls thereof. In this manner, a cast composition is obtained which may be chopped and cut as before, or may be used in other processes for which such a configuration or any modification thereof is desirable.

Any thermoplastic polyurethane elastomeric composition prepared by the reaction between an organic compound containing at least two active hydrogen containing groups as determined by the Zerewitinoff method, an organic diisocyanate and a chain-extending agent may be processed according to the herein-defined method.

Any suitable organic compound containing active hydrogen atoms which are reactive with —NCO groups and having a molecular weight of from about 500 to about 3000 may be used such as, for example, hydroxyl polyesters, polyester amides, polyhydric polyalkylene ethers, polyhydric polythioethers, polyacetals and the like. Any suitable hydroxyl polyester may be used such as, for example, the reaction product of a dicarboxylic acid and a dihydric alcohol. Any suitable dicarboxylic acid may be used in the preparation of the polyesters such as, for example, adipic acid, succinic acid, suberic acid, sebacic acid, oxalic acid, methyl adipic acid, glutaric acid, pimelic acid, azelaic acid, phthalic acid, terephthalic acid, isophthalic acid, thiodiglycollic acid, thiodipropionic acid, maleic acid, fumaric acid, citraconic acid, itaconic acid, and the like. Of course, the corresponding acid anhydrides may also be used. Any suitable dihydric alcohol may be used in the preparation of the polyesters such as, for example, ethylene glycol, propylene glycol, hexanediol, bis-(hydroxymethyl cyclohexane), 1,4-butanediol, 1,3-butanediol, diethylene glycol, polyethylene glycol, 2,2-dimethyl propylene glycol, xylylene glycol and the like.

Any suitable polyhydric polyalkylene ether may be used such as, for example, the condensation product of an alkylene oxide with a small amount of a compound containing active hydrogen containing groups such as, for example, water, ethylene glycol, propylene glycol, butylene glycol, amylene glycol and the like. Any suitable alkylene oxide condensate may also be used such as, for example, condensates of ethylene oxide, propylene oxide, butylene oxide, amylene oxide, styrene oxide and mixtures thereof. The polyalkylene ethers prepared from tetrahydrofuran may also be used. The polyhydric polyalkylene ethers may be prepared by any known process such as, for example, the process described by Wurtz in 1859 and in the "Encyclopedia of Chemical Technology," vol. 7, pages 257 to 262, published by Interscience Publishers in 1951 or in U.S. Patent 1,922,459.

Any suitable monomeric organic diisocyanate may be used in the practice of this invention such as, for example, ethylene diisocyanate, ethylidene diisocyanate, propylene diisocyanate, butylene diisocyanate, cyclopentylene - 1,3 - diisocyanate, cyclohexylene - 1,4 - diisocyanate, cyclohexylene - 1,2 - diisocyanate, 2,4 - toluylene diisocyanate, 2,6-toluylene diisocyanate, 4,4'-diphenyl methane diisocyanate, 2,2' - diphenyl propane - 4,4' - diisocyanate, 3,3'-dimethyl diphenyl methane-4,4'-diisocyanate, p-phenylene diisocyanate, m-phenylene diisocyanate, dibenzyl - 4,4' - diisocyanate, xylylene diisocyanate, 1,4-naphthylene diisocyanate, 1,5-naphthylene diisocyanate, diphenyl-4,4'-diisocyanate, azobenzene-4,4'-diisocyanate, diphenyl sulphone-4,4'-diisocyanate, dichlorohexamethylene diisocyanate, tetramethylene diisocyanate, pentamethylene diisocyanate, hexamethylene diisocyanate, 1 - chlorobenzene - 2,4 - diisocyanate, furfurylidene diisocyanate, 2,7-diisocyanate-dibenzofuran and the like. It is preferred, however, that the aromatic diisocyanates be used. Any suitable uretdione diisocyanate may be used such as, for example, the dimers of any of the above-mentioned diisocyanates. It is preferred to use the dimeric 2,4-toluylene diisocyanates.

Any suitable chain lengthening agents having active hydrogen atoms which are reactive with —NCO groups such as, for example, glycols, primary and secondary diamines, hydrazine which may be substituted, polyhydrazides, bis-semicarbazides, biscarbazine-esters, other compounds with hydrazide groups, water and the like may be reacted with the preliminary adducts having the terminal isocyanate groups. Preferably the reaction is carried out with equivalent amounts so that free isocyanate groups are no longer present.

In view of the high reaction speed obtained with the aliphatic diamines and hydrazines, reactions with these compounds are conveniently carried out in solution. The chain lengthening reaction with hydrazide compounds described in the German specification DAS 1,123,467, may be carried out at room temperature in solvents. The reaction with glycols may also be effected in the melt, solvents being used only subsequently.

The following examples may be given for chain lengthening agents which may be used either individually or admixture: 1,4-butanediol, butene-2-diol-1,4, 1,6-hexanediol, 2,5-hexanediol, thiodiglycol, 1,3- and 1,4-hexahydroxylylene glycol, 1,3- and 1,4-cyclohexanediol, 1,4-phenylene-bis-hydroxyethylether, 1,5-naphthalene-bis-hydroxyethylether, glycerine-mono-allyl-ether, N,N'-bis-hydroxyethyl urea, N,N'-bis-hydroxyethylaniline and the like; amino alcohols, such as ethanolamine or propanolamine and the like; diamines such as ethylene diamine, tetramethylene diamines, hydrazine, N,N'-dimethyl hydrazine, N,N'-diamino-piperazine, 1,6-hexamethylene-bis-hydrazine, N,N'-dimethyl-hexamethylene-diamine-1,6-piperazine, 1,4 - diamino - cyclohexane, 4,4' - diamino-diphenylmethane, 4,4'-diaminodiphenyl-dimethylmethane, 1,3,5-triethyl-2,4-diaminobenzene, 3,3'-dichloro- or 3,3'-dimethyl- or 3,3'-dimethyl- or 3,3'-dimethoxy-4,4'-diamino-diphenylmethane and the like; water, dicarboxylic acids, or hydrazides of dicarboxylic acids and disulphonic acids such as adipic acid dihydrazide, oxalic acid dihydrazide, isophthalic acid dihydrazide, thiodipropionic acid dihydrazide, tartaric acid dihydrazide, 1,3-phenylene-disulphonic acid dihydrazide and the like; carbodihydrazide as well as ω-aminocapronic acid dihydrazide, γ-hydroxybutyric acid hydrazide, bissemicarbazide, as well as bis-hydrazine carbonic esters of glycols such as butanediol or ethylene glycol and the like.

Preferably compounds are used which give rise in the polymer to —NH—CO—NH—, —NH.CO.NH.NH—, NH.CO.NH.NH.CO— groups, for example, water, diamines, hydrazine or hydrazide derivatives. When glycols are used as lengthening agents, one of the compounds referred to above is preferably used in conjunction therewith. Monofunctional or tri- or higher functional chain lengthening agents may be used in small amounts in conjunction with the compounds recited above.

The internally lubricated polyurethane elastomers obtained according to the process of this invention find utility in a number of divergent uses such as, for example, in injection molding, extrusion, compression molding, calendering, casting and milling and the like, into various final objects such as, for example, ball joints, bushings, shoe soles and heels, shock absorbers, fibers such as Spandex and the like.

The invention is further illustrated, but not limited by the following examples in which all parts and percentages are by weight unless otherwise specified.

*Example 1*

To about 100 parts of a hydroxyl polyester having a molecular weight of about 2000, a hydroxyl number of about 56, and an acid number of less than 2, prepared by reacting about 10 mols of adipic acid and about 11 mols of 1,4-butanediol, are added, about 33 parts of p-phenylene - bis-(beta-hydroxyethylether). After mixing, about 60 parts of 4,4'-diphenylmethane diisocyanate are added. Prior to mixing these ingredients, each is separately heated to a temperature of about 105° C. On the addition of the isocyanate to the polyester mixture, mechanical mixing is conducted for a period of about 1 minute to insure the intimate contact of the ingredients. This reaction mixture is then cast continuously onto a polyethylene sheet having a molecular weight of about 150,000 and a melt index of about 240 which is also fed continuously and colinearly onto the top of a moving belt. Simultaneously, a second sheet of polyethylene having a molecular weight of about 50,000 and a melt index of about 1000 is fed continuously and colinearly onto the top of the reaction mixture. The laminate thus formed is conveyed through an oven heated to about 110–115° C. The reaction mixture solidifies, and upon exit from the oven, the solidified slab having the polyethylene sheets adhered thereto is easily removed from the conveyor belt. No contamination of the belt with any polyurethane is observed due to the intervention therebetween of the polyethylene sheeting. Further, the surface of the polyurethane is homogeneous with respect to cross-linking and therefore with respect to the rest of the slab since the top sheet of the polyethylene prevents further reaction on the surface of the polyurethane with any water in the air.

When the polyurethane - polyethylene laminate has cooled to room temperature, it is passed through a cutter and reduced to particles which are subsequently blended to insure a uniform distribution of the polyethylene in the polyurethane. The particles are then converted into uniform pellets by extrusion and die-face cutting.

*Example 2*

To about 100 parts of a hydroxyl polyester having a molecular weight of about 2000, a hydroxyl number of about 56, and an acid number of less than 2, prepared by reacting about 10 mols of adipic acid and about 11 mols of 1,4-butanediol, are added, about 33 parts of p-phenylene-bis-(beta-hydroxylethylether). After mixing, about 60 parts of 4,4'-diphenylmethane diisocyanate are added. Prior to mixing these ingredients, each is separately heated to a temperature of about 105° C. On the addition of the isocyanate to the polyester mixture, mechanical mixing is conducted for a period of about 1 minute to insure the intimate contact of the ingredients. This reaction mixture is then cast continuously onto a polypropylene sheet having a molecular weight of about 150,000 and a melt index of about 150 which is also being fed continuously and colinearly onto the top of a moving belt. Simultaneously, a second sheet of polypropylene having a molecular weight of about 30,000 and a melt index of about 1200 is fed continuously and colinearly onto the top of the reaction mixture. The laminate thus formed is conveyed through an oven heated to about 110–115° C. The reaction mixture solidifies, and upon exit from the oven, the solidified slab having the polypropylene sheets adhered thereto is easily removed from the conveyor belt. No contamination of the belt with any polyurethane is observed due to the intervention therebetween of the polypropylene sheeting. Further, the surface of the polyurethane is homogeneous with respect to cross-linking and therefore with respect to the rest of the slab since the top sheet of polypropylene prevents further reaction on the surface of the polyurethane with any water in the air.

When the polyurethane-polypropylene laminate has cooled to room temperature, it is passed through a cutter and reduced to particles which are subsequently blended to insure a uniform distribution of the polypropylene in the polyurethane. The particles are then converted into uniform pellets by extrusion and die-face cutting. The thus internally lubricated polyurethane pellets are then extruded into a continuous flat sheet from which commercial shoe parts are stamped out.

*Example 3*

To about 100 parts of a hydroxyl polyester having a molecular weight of about 2000, a hydroxyl number of about 56, and an acid number of less than 2, prepared by reacting about 10 mols of adipic acid and about 11 mols of 1,4-butanediol, are added, about 33 parts of p-phenylene - bis - (beta-hydroxylethylether). After mixing, about 60 parts of 4,4'-diphenylmethane diisocyanate are added. Prior to mixing these ingredients, each is separately heated to a temperature of about 105° C. On the addition of the isocyanate to the polyester mixture, mechanical mixing is conducted for a period of about 1 minute to insure the intimate contact of the ingredients. This reaction mixture is then cast onto a polypropylene sheeting having a molecular weight of about 150,000 and a melt index of about 150 which is being fed colinearly onto the top of a moving belt. The belt conveys the reaction mixture with the polypropylene sheeting through an oven heated to a temperature of about 110–115° C. The reaction mixture solidifies, and upon exit from the oven, the solidified slab having the polypropylene sheeting adhered thereto is scored and easily removed from the conveyor belt. No contamination of the belt with any polyurethane is observed due to the intervention therebetween of the polypropylene sheeting.

When the polyurethane-polypropylene laminate has cooled to room temperature, it is passed through a cutter and reduced to particles which are subsequently blended to insure a uniform distribution of the polypropylene in the polyurethane. The particles are then converted into uniform pellets by extrusion and die-face cutting. The thus internally lubricated polyurethane pellets are then transformed into shoe heels by an injection molding process.

*Example 4*

To about 100 parts of a hydroxyl polyester having a molecular weight of about 2000, a hydroxyl number of about 56, and an acid number of less than 2, prepared by reacting about 10 mols of adipic acid and about 11 mols of 1,4-butanediol, are added, about 33 parts of p-phenylene-bis-(beta-hydroxylethylether). After mixing, about 60 parts of 4,4'-diphenylmethane diisocyanate are added. Prior to mixing these ingredients, each is separately heated to a temperature of about 105° C. On the addition of the isocyanate to the polyester mixture, mechanical mixing is conducted for a period of about 1 minute to insure the intimate contact of the ingredients. This reaction mixture is then cast onto a polyethylene sheeting having a molecular weight of 150,000 and a melt index of about 240 which is being fed colinearly onto the top of a moving belt. The belt conveys the reaction mixture with the polyethylene sheeting through an oven heated to a temperature of about 110–115° C. The reaction mixture solidifies, and upon exit from the oven, the solidified slab having the polyethylene sheeting adhere thereto is scored and easily removed from the conveyor belt. No contamination of the belt with any polyurethane is observed due to the intervention therebetween of the polyethylene sheeting.

When the polyurethane-polyethylene laminate has cooled to room temperature, it is passed through a cutter and reduced to particles which are subsequently blended to insure a uniform distribution of the polyethylene in the polyurethane. The particles are then converted into uniform pellets by extrusion and die-face cutting.

*Example 5*

To about 100 parts of a hydroxyl polyester having a molecular weight of about 2000, a hydroxyl number of about 56, and an acid number of less than 2, prepared by reacting about 10 mols of adipic acid and about 11 mols of 1,4-butanediol, are added, about 33 parts of p-phenylene-bis-(beta-hydroxylethylether). After mixing, about 60 parts of 4,4'-diphenylmethane diisocyanate are added. Prior to mixing these ingredients, each is separately heated to a temperature of about 105° C. On the addition of the isocyanate to the polyester mixture, mechanical mixing is conducted for a period of about 1 minute to insure the intimate contact of the ingredients. This reaction mixture is then cast onto a polypropylene sheet having a molecular weight of about 150,000 and a melt index of about 150 which is being fed colinearly onto the top of a moving belt. Simultaneously, a sheet of polyethylene having a molecular weight of about 50,000 and a melt index of about 1000 is fed colinearly onto the top of the reaction mixture. The laminate thus formed is conveyed through an oven heated to about 110–115° C. The reaction mixture solidifies and on exit from the oven, the solidified slab having the polypropylene-polyethylene sheets adhered thereto is easily removed from the conveyor belt. No contamination of the belt with any polyurethane is observed due to the intervention therebetween of the polypropylene sheeting. Further, the surface of the polyurethane is homogeneous with respect to cross-linking, and therefore, with respect to the rest of the slab since the top sheet of polyethylene prevents further reaction on the surface of the polyurethane with any water in the air.

When the polyurethane - polypropylene - polyethylene laminate has cooled to room temperature, it is passed through a cutter and reduced to particles which are subsequently blended to insure a uniform distribution of the polypropylene-polyethylene in the polyurethane. The particles are then converted into uniform pellets by extrusion and die-face cutting.

It is to be understood that the foregoing working examples are for the purpose of illustration only and any other suitable organic polyisocyanate and active hydrogen containing compound may be used in the preparation of the polyurethane in accordance with the teachings of the disclosure.

Although the invention has been described in considerable detail in the foregoing specification and working examples, it is to be understood that such detail is solely for the purpose of illustration and that many variations can be made by those skilled in the art without departing from the spirit and scope of the invention except as set forth in the claims.

What is claimed is:

1. In a method for simultaneously protecting a polyurethane reaction mixture from moisture absorption and providing a lubricant for subsequent shaping operations wherein the polyurethane has from about 0.2 percent to about 5 percent by weight of a polyolefin selected from the group consisting of polyethylene, polypropylene, and mixtures thereof dispersed substantially uniformly therein, said polyolefin having a melt index of at least about 115 and a molecular weight of from about 1000 to about 500,000, the improvement which comprises disposing a mixture of components which will react to form a polyurethane between two sheets of a polyolefin selected from the group consisting of polyethylene, polypropylene, and mixtures thereof, allowing chemical reaction to form a product which can be shaped by thermoplastic shaping methods and thereafter reducing the resulting laminate to particulate form.

2. A method for the preparation of a polyurethane having from about 0.2% to about 5% by weight of a polyolefin selected from the group consisting of polyethylene, polypropylene, and mixtures thereof dispersed substantially uniformly therein, said polyolefin having a melt index of at least about 115 and a molecular weight of from about 1000 to about 500,000, which comprises pouring the polyurethane melt onto a surface having disposed thereon a sheet of the said polyolefin, covering the top surface of the said polyurethane with a second sheet of polyolefin, allowing the said polyurethane to cool with the said polyolefin sheets adhered thereto, cutting and chopping the said polyurethane having the polyolefin sheets adhere thereto as a unit, and thereafter reducing the particle size and blending the polyurethane with the polyolefins to disperse the polyolefins substantially uniformly therein.

3. The method of claim 2 in which the polyolefin is a polyethylene.

4. A method for the preparation of a polyurethane having from about 0.2% to about 5% by weight of a polyolefin selected from the group consisting of polyethylene, polypropylene, and mixtures thereof dispersed substantially uniformly therein, said polyolefin having a melt index of at least about 115 and a molecular weight of from about 1000 to about 500,000, which comprises pouring the polyurethane melt onto a surface having disposed thereon a sheet of the said polyolefin having a molecular weight of from about 100,000 to about 500,000, covering the top surface of the said polyurethane with a second sheet of polyolefin having a molecular weight of from about 10,000 to about 50,000, allowing the said polyurethane to cool with the said polyolefin sheets adhered thereto as a unit, further incorporating a polyolefin having a molecular weight of from about 1000 to about 4000 and thereafter reducing the particle size and blending the polyurethane with the polyolefins to disperse the polyolefins substantially uniformly therein.

5. The method of claim 4 wherein the polyolefin is polyethylene.

6. A method for the preparation of a polyurethane having dispersed substantially uniformly therein a high molecular weight polyolefin and a low molecular weight polyolefin selected from the group consisting of polyethylene, polypropylene, and mixtures thereof, said high molecular weight polyolefins having a molecular weight of from about 100,000 to 500,000 and being present in a ratio of about 0.5 to about 2 parts of a high molecular weight polyolefin per part of the said low molecular weight polyolefin, said low molecular weight polyolefin having a molecular weight of about 10,000 to about 50,000, the total quantity of said high and said low molecular weight polyolefins being from about 0.2% to about 5% by weight of the polyurethane, a mixture of said high and said low molecular weight polyolefins within said ratio and molecular weight ranges having a melt index of at least about 115, which comprises pouring the polyurethane melt onto a surface having disposed thereon a sheet of the said high molecular weight polyolefin, and covering the top surface of the said polyurethane with a sheet of the said low molecular weight polyolefin, allowing the polyurethane to cool with the said polyolefin sheets adhered thereto, cutting and chopping the said polyurethane having the polyolefin sheets adhered thereto as a unit, and thereafter reducing the particle size and blending the polyurethane with the polyolefin to disperse the polyolefin substantially uniformly therein.

7. The method of claim 6 in which the polyolefin is polyethylene.

8. A method for the preparation of a polyurethane having from about 0.2% to 5% by weight of a polyolefin selected from the group consisting of polyethylene, polypropylene, and mixtures thereof, dispersed substantially uniformly therein, said polyolefin having a melt index of at least about 115 and a molecular weight of from about 1000 to about 500,000, which comprises pouring the polyurethane melt onto a surface having disposed thereon a sheet of the said polyolefin, allowing the said polyurethane to cool with the said polyolefin sheet adhered thereto, cutting and chopping the said polyurethane having the polyolefin sheet adhered thereto as a unit, further incorporating a polyolefin having a molecular weight of from about 1000 to about 4000 therein and thereafter reducing the particle size and blending the polyurethane with the polyolefin to disperse the polyolefins substantially uniformly therein.

9. The method of claim 8 wherein the polyolefin is a polyethylene.

10. A method for the preparation of a polyurethane having from about 0.2% to 5% by weight of a polyolefin selected from the group consisting of polyethylene, polypropylene, and mixtures thereof dispersed substantially uniformly therein, said polyolefin having a melt index of at least about 115 and a molecular weight of from about 1000 to about 500,000, which comprises pouring the polyurethane melt onto a surface having disposed thereon a sheet of the said polyolefin, allowing the said polyurethane to cool with the said polyolefin sheet adhered thereto, cutting and chopping the said polyurethane having the polyolefin sheet adhere thereto as a unit, and thereafter reducing the particle size and blending the polyurethane with the polyolefin to disperse the polyolefins substantially uniformly therein.

References Cited
FOREIGN PATENTS 649,568   10/1962   Canada.
936,741   9/1963   Great Britain.

SAMUEL H. BLECH, *Primary Examiner.*

MURRAY TILLMAN, *Examiner.*

P. LIEBERMAN, *Assistant Examiner.*